United States Patent Office 3,138,572
Patented June 23, 1964

3,138,572
POLYMERIC COMPOSITIONS STABILIZED AGAINST HEAT, AGING AND LIGHT WITH DIPHENYL SULFONES
Giuseppe Leandri, Poggio Franco, Bari, Italy, assignor to Montecatini, Società Generale per l'Industria Mineraria e Chimica, Milan, Italy
No Drawing. Filed June 22, 1961, Ser. No. 118,780
Claims priority, application Italy June 27, 1960
5 Claims. (Cl. 260—45.9)

This invention relates to stabilized polymeric compositions comprising polymeric alpha-olefins and to a process for stabilizing fibers, films and other manufactured articles of crystalline polymeric alpha-olefins.

It is known that polymeric alpha-olefins undergo a certain degradation during hot working in the presence of atmospheric oxygen. It is also known that manufactured articles of crystalline polymeric alpha-olefins are sensitive to light and heat.

The degradation can be reduced by adding particular protective substances to the polymer, in particular by adding the protective agents during the preparation of fibers, films, etc. Various protective agents have been proposed for minimizing the degradation, including small amounts of phenols, amines, sulfur compounds, aminophenols, mercaptans, organo-tin compounds, phosphites and various other compounds such as e.g., 2,6-tertiary butyl-p-cresol β-naphthylamine, p-phenylene diamine, styrenated phenols, 2,5-di-tertiary butyl-hydroquinone, 2-octyl-4-methoxybenzophenone, 4,4-thiobis-3-methyl-6-tertiary butyl phenol, 2,2'-methylene-bis-4-ethyl-6-tertiary butylphenol, 4,4' isotropylidene phenol, phenyl-α-naphthylamine, phenyl-β-naphthylamine, polytrimethyldihydroquinoline, methyl ethyl ketoxime, cyclohexanone oxime, paraquinonediozime, N,N'-diphenylethylene diamine, diphenyl-p-phenylene diamine, basic zinc dialkyldithiophosphates, tris nonylphenylphosphite, nickel butyldithiocarbamate, etc.

It is an object of this invention to provide a novel method of stabilizing crystalline polymeric alpha-olefins against degradation from heat, light and aging, and to provide an improved stabilized crystalline polymeric alpha-olefin composition. Additional objects will become apparent hereinafter.

I have surprisingly found that compounds having the general formula

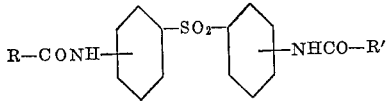

wherein R and R' are either aryl or substituted aryl wherein the substituents are alkyl, alkoxy or alkanoyl when mixed with the crystalline polyalpha olefin in an amount up to 2% by weight of the polyolefin, exhibit a high stabilizing effect against the action of heat and, in several instances, against the action of aging and of the light.

Such compounds also act as stabilizers for compositions comprising polyolefins and basic nitrogen compounds, e.g., polyalkyleneimines (copending application Serial No. 702,430), condensation products of dichloroethane with polyfunctional amines (copending application Serial No. 83,141/60), polyalkyleneimines plus a dispersant (copending application Serial No. 8,529/60), condensation products of epichlorohydrin with primary amines (copending application Serial No. 30,732/60), polyvinylpyridines (copending application Serial No. 46,391/60), which compositions may be used to produce textile fibres having improved tinctorial characteristics.

According to one specific aspect of my invention a crystalline polypropylene is stabilized against the action of heat, aging and light by adding to the polypropylene in an amount from about 0.02% to 2% by weight of the resulting mixture, a compound having the general formula

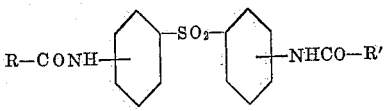

wherein R and R' are as previously defined. A more preferred range is from 0.2 to 1% by weight of the resulting mixture.

The following compound has been found to be particularly suitable for stabilizing polyolefins:

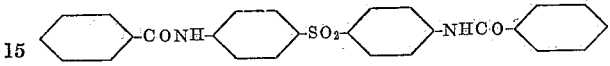

p,p'-di(benzoylamine)-diphenyl sulfone. Other suitable compounds which exhibit a desirable stabilizing action on poly-alpha-olefins include p,p'-di(naphthoylamino)-diphenylsulfone, p,p'-di(p-methoxy-benzoylamino)-diphenylsulfone and p,p'-di(p-ethoxybenzoylamino)-diphenyl sulfone.

The addition of the stabilizing compound to the crystalline polymeric alpha-olefin generally is carried out by mixing such compound with the polymeric composition while agitating.

However the stabilizer may be added by other methods, such as e.g., by mixing the polyolefin with a solution of the stabilizer in a suitable solvent and then evaporating off the solvent, or by adding the stabilizer to the polyolefin at the end of its polymerization. It is also possible to apply the stabilizer to the manufactured article, e.g., by immersing the article in a solution or dispersion of stabilizer and then evaporating off the solvent or dispersing media. The compounds of the present invention exhibit a good compatibility with polyolefins that are in the molten state and do not stain.

The addition of an antacid such as an inorganic salt of stearic acid, e.g., calcium stearate, to the compositions of the present invention before the spinning thereof improves the stability characteristics of such compositions.

The following example will illustrate the present invention without limiting its scope. All parts are by weight unless otherwise stated. The polypropylene used in this example is a crystalline polypropylene consisting prevailingly of isotactic macromolecules, as defined by Natta et al., e.g., U.S. Patent 2,882,263.

Example

In a Werner-type mixer a homogeneous mixture is prepared at room temperature from 9.95 kg. of polypropylene (prepared with the aid of stereospecific catalysts such as e.g. those on the basis of an alkyl aluminum compound and a crystalline transition metal halide, and having an intrinsic viscosity [η], determined in tetrahydronaphthalene at 135° C., of 1.65, a residue after heptane extraction of 94.8%, and an ash content of 0.052%) and 50 g. of p,p'-di(benzoylamino)-diphenyl sulfone,

The stabilizer-polymer mix, when subjected to melting in a test tube kept in a thermostatic bath at 250° C. for 10 minutes produces a nearly colorless molten mass. The mix is spun in a melt spinning device under the following conditions:

Screw temperature ---------------- 210° C.
Head temperature ----------------- 220° C.
Spinneret temperature ------------ 200° C.
Spinneret type -------------------- 60/0.8 x 16 mm.
Maximum pressure ---------------- 45 kg./cm.²
Winding speed -------------------- 240 meters/min.

The fibers are stretched with a stretching ratio of 1:6.3 at 135° C. The serimetric characteristics of the fibers obtained are as follows:

Tenacity _____ 4.6 g./den.
Elongation _____ 20%.

The intrinsic viscosity [η] of the stabilized yarn is 1.29 whereas that of the yarn control obtained from the same polymer but without the addition of stabilizer is 1.12.

The stabilized yarn, when exposed for 15 hours to the action of heat in an oven provided with air circulation at 120° C. remains virtually unaltered in its characteristics.

After exposure to an ultra violet mercury lamp for 20 hours the stabilized yarn maintains 48% of its initial tenacity wherein the tenacity of the non-stabilized yarn control is reduced to 31% of the initial value.

Variations can of course be made without departing from the spirit of my invention.

Having thus described the invention, what I desire to secure and hereby claim is:

1. A polymeric composition that is stable against the action of heat, aging and light, comprising a crystalline polypropylene consisting prevailingly of isotactic macromolecules and from about 0.02 to 2% by weight, based on the polypropylene, of a stabilizing organic compound having the general formula

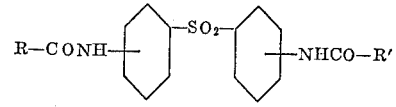

wherein R and R' are selected from the group consisting of aryl and alkoxy aryl.

2. The polymeric composition of claim 1 wherein the amount of stabilizing organic compound is from about 0.2 to 1%.

3. The polymeric composition of claim 1 wherein the stabilizing organic compound is p,p'-di(benzoylamino) diphenylsulfone,

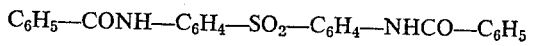

4. The composition of claim 1 in filamentary form.
5. The composition of claim 1 in film form.

No references cited.

UNITED STATES PATENT OFFICE
CERTIFICATE OF CORRECTION

Patent No. 3,138,572

June 23, 1964

Giuseppe Leandri

It is hereby certified that error appears in the above numbered patent requiring correction and that the said Letters Patent should read as corrected below.

Column 1, line 32, for "isotropylidene" read -- isopropylidene --.

Signed and sealed this 10th day of November 1964.

(SEAL)
Attest:

ERNEST W. SWIDER
Attesting Officer

EDWARD J. BRENNER
Commissioner of Patents